ary Examiner—Jeanette M. Hunter

United States Patent [19]
Havette et al.

[11] 4,428,971
[45] Jan. 31, 1984

[54] PROCESS FOR THE PREPARATION OF A COMPOSITION FOR FROZEN OR DEEP-FROZEN SOUFFLÉS

[75] Inventors: Bernard Havette, Bresles; Christian Hebert, Beauvais, both of France

[73] Assignee: Societe d'Assistance Technique pour Produits Nestle S.A., Lausanne, Switzerland

[21] Appl. No.: 397,980

[22] Filed: Jul. 14, 1982

[30] Foreign Application Priority Data

Jul. 29, 1981 [FR] France ............................ 81 14751

[51] Int. Cl.³ .................. A23C 19/09; A23C 19/093; A23C 9/00; A23C 9/06
[52] U.S. Cl. ............................... 426/565; 426/568; 426/582; 426/583; 426/474
[58] Field of Search ............... 426/564, 565, 582, 583, 426/565, 474, 568

[56] References Cited

U.S. PATENT DOCUMENTS

| | | | |
|---|---|---|---|
| 3,333,965 | 8/1967 | Kurtzhalts | 426/564 |
| 3,615,583 | 5/1969 | Bard | 426/564 |
| 3,655,405 | 4/1972 | Karas et al. | 426/568 |
| 4,068,013 | 1/1978 | Brule | 426/568 |

*Primary Examiner*—Jeanette M. Hunter
*Attorney, Agent, or Firm*—Vogt & O'Donnell

[57] ABSTRACT

A successful frozen savory or sweet soufflé which rises during baking and only collapses moderately when it is served is prepared from a base mass comprising a baked panada based on fat, flour, water and cream, a flavouring base composed of vegetables, cheese, fish or fruit, egg yolks and texturizing proteins by mixing the different ingredients without whipping of the proteins and incorporating carbon dioxide gas in the mass.

6 Claims, No Drawings

PROCESS FOR THE PREPARATION OF A COMPOSITION FOR FROZEN OR DEEP-FROZEN SOUFFLÉS

This invention relates to a process for the preparation of a composition for frozen or deep-frozen soufflés.

The difficulty of preparing a successful soufflé that is, a soufflé which rises as it should during baking and only collapses moderately when it is served, is known. Moreover, a soufflé is usually prepared on the spot to ensure that it is fresh, and is served and eaten immediately. This is just as true for savoury soufflés, notably cheese soufflés, as it is for second course or sweet soufflés.

Thus, attempts have been made to provide preparations for frozen soufflés in an individual package, which merely have to be put into the oven and baked to obtain a soufflé which is a success every time and is similar to a fresh soufflé. Processes for the preparation of frozen or deep-frozen sweet soufflés are thus described in French Patent Nos. 2,082,138 and 2,346,987. They involve the use of a considerable quantity of egg white which is beaten until stiff and made into a meringue and which, as in the conventional recipe, should be carefully mixed with choux pastry which may have been mixed with confectioner's custard. Processes of this type are difficult to industrialise on a large scale due to the precautions which have to be taken during the preparation of the whipped egg whites and during their incorporation into the choux pastry dough which is capable of maintaining their aerated texture.

Other developments in relation to frozen or deep-frozen preparations for soufflé omelettes, for example according to U.S. Pat. No. 3,073,704, or for pancakes, for example according to U.S. Pat. No. 4,022,917 specify the incorporation of a leavening agent, such as sodium bicarbonate which may be encapsulated in a fat and is capable of releasing carbon dioxide when heated by a reaction with an acid present in the dough. The addition of baking powder to a soufflé which is to resemble a fresh soufflé as closely as possible is undesirable.

Applicants have found that it is possible to prepare industrially, by a simple process, frozen or deep-frozen savoury or sweet soufflés which have all the characteristics of a fresh soufflé, that is, without the incorporation of baking powder, and which are capable of rising, without collapsing, when they are subsequently baked.

The process according to the present invention, in which a base mass comprising the following is prepared:
- a baked panada based on fat, flour, water and cream,
- a charge composed of vegetables, cheese, fish or fruit,
- egg yolks, and
- texturizing proteins, is characterised in that the different ingredients are mixed, without whipping of the proteins, and carbon dioxide gas in incorporated in the base mass.

Hereafter, the term "texturizing proteins" will be understood as designating proteins which are capable of participating, by baking, in the formation of a network which becomes rigid on cooling, allowing, inter alia, the light and aerated texture of the product to be maintained for some time after the souffle has been removed from the oven.

The process of the present invention is carried out as follows, in a first preparation variant of a savoury product:

I. A panada of flour in fat, in a proportion of from 0.6 to 1 time the weight of the flour is prepared by baking for 3 to 10 minutes at from 80° to 100° C. Butter, margarine or any other vegetable fat may be used as the fat. Seasonings and spices, for example pepper, nutmeg etc., are added, as is water and dairy cream to provide a total of preferably from 1 to 2 times the weight of the flour.

II. A cheese soufflé will be described thereafter as an example of a savoury product, in which the cheese forms the flavouring base. It is obvious that it is possible to replace the cheese base by a charge of vegetables, for example spinach, or by small pieces of fish. In order to prepare this base, the following ingredients are mixed together: hot water, sweet buttermilk, i.e., originating from the production of non-acid butter or, in a variant, a mixture of skimmed milk and natural lecithins, and cooked curd cheese, for example Emmental, parmesan or processed cheese, in which case a calcium salt, for example calcium chloride is added in order to counteract the influence of the emulsifying salts on the functional properties of the texturizing proteins. In order to obtain a product having a long storage life, the heat treatment of the mixture is preferably effected at a temperature of, for example from 80° to 100° C., and thereafter the dispersion is crushed to obtain a smooth mass.

III. A protein base is then prepared which consists of powdered egg whites and lactic proteins in a weight ratio of proteins to egg white of from 0.3 to 3, which is rehydrated by adding a suitable quantity of water. Whey and/or skimmed milk proteins which have undergone an ultrafiltration treatment, having a low content of lactose and a protein concentration of at least 50% by weight are preferably used as lactic proteins.

The base masses I, II and III are mixed while adding egg yolks, for example yolks which are fresh or reconstituted by thawing or rehydration. Mixing is carried out in a mixer which operates at a slow speed in order to avoid whipping and the incorporation of air, in the following weight proportions:
- egg yolk: from 3 to 12%
- panada base: from 10 to 50%
- flavouring base: from 25 to 55%, and
- protein base: from 25 to 50%.

In a variant, it is possible to incorporate the bases II and III all at once.

In a varient, if a sweet soufflé is desired, sugar is incorporated into bases II and/or III to obtain the desired organoleptic quality. The soufflé may be flavoured by incorporating pieces of fruit or puree, or by incorporating a juice or flavour obtained by concentrating a natural fruit juice. A sweet or non-sweet essence, or an alcoholic liqueur may also be incorporated into the bases II or III.

The subsequent operation, whether for the preparation of a savoury or sweet product, comprises dissolving carbon dioxide gas in the mixture either at a temperature below 30° C. or, in a preferred variant, in the form of solid carbon dioxide in a proportion of from 0.5 to 2% by weight, in a planetary mixer.

The soufflé preparation is then packed in individual aluminum packages. The packages may be of any suitable dimension and shape, depending on the thickness of the product, and may be in container suitable for reheating. Round containers of a volume of 125 ml may be used, for example. The filled packages are deep-frozen in a tunnel or plate freezer, at about −35° C.

The following Examples, in which the quantities and percentages are based on weight, unless otherwise indicated, illustrate the present invention.

EXAMPLE 1

Cheese soufflé (Emmental)

| | | |
|---|---|---|
| Margarine | 7 | ⎫ |
| Wheat flour | 11 | ⎪ |
| Cream | 4 | ⎬ panada base |
| Spices | 0.5 | ⎪ |
| Water | 13 | ⎭ |
| Grated Emmental | 17 | ⎫ |
| Sweet buttermilk | 15 | ⎬ cheese base |
| Water | 10 | ⎭ |
| Egg yolk | 10 | |
| Lactic proteins | 4 | ⎫ |
| Powdered egg white | 2 | ⎬ protein base |
| Water | 20 | ⎭ |
| | 100 | |

The preparation process is as mentioned on pages 3 and 4, and the carbon dioxide gas is dissolved by adding 2% of solid carbon dioxide into a planetary mixer at a temperature of 25° C. with slow agitation to avoid expansion by air, and this is continued until the gas has completely dissolved. Packaging and deep-freezing are carried out as indicated above.

EXAMPLE 2

Sweet soufflé (pear)

| | | |
|---|---|---|
| Margarine | 4 | |
| Wheat flour | 6 | ⎫ |
| Cream | 2 | ⎬ panada base |
| Water | 4.5 | ⎭ |
| Egg yolk | 10 | |
| Pear puree | 40 | ⎫ |
| | | ⎬ aromatic base |
| Sugar | 10 | ⎭ |
| Lactic proteins | 3 | ⎫ |
| Egg white | 3.5 | ⎬ protein base |
| Water | 15 | ⎭ |
| | 100 | |

The panada is prepared as indicated under I above. The egg white is added, followed by the mixture of aromatic base and proteins. The carbon dioxide gas is dissolved by being brought into contact with the above-prepared mass and by continuously bubbling in a tube which is internally provided, by way of accessory, with baffles and may be cooled by the circulation of a cooling fluid in a jacket. The gas is dissolved under these conditions at a temperature of about 20° C. and under a pressure of 1.5 $10^5$ pascal at a rate of about 150 liters of gas per 100 kg of mass.

The products are packed and deep-frozen as indicated above.

We claim:

1. A process for preparing frozen soufflé from a composition comprising a panada base, a flavouring base, egg yolk and a protein base which comprises:
   (a) preparing a panada base by mixing flour with a fat, the amount of fat present being from 0.6 to 1 time the weight of the flour, and heating the mixture while stirring for 3 to 10 minutes at 80° to 100° C., adding seasonings and spices, water and dairy cream to provide a total of 1 to 2 times the weight of the flour, said panada base representing from 10 to 50% by weight of the composition;
   (b) preparing a flavouring base comprising vegetables, cheese, fish, fruit and/or sugar, said flavouring base representing from 25 to 55% by weight of the composition;
   (c) preparing a protein base by mixing egg white and lactic protein, the amount of lactic protein present being from 0.3 to 3 times the weight of the egg white, said protein base representing from 25 to 55% by weight of the composition;
   (d) combining the panada base, the flavouring base and the protein base with egg yolk while avoiding whipping and the incorporation of air into the resulting composition, said egg yolk representing from 3 to 12% by weight of the composition;
   (e) incorporating carbon dioxide in the composition at a temperature below 30° C. in a proportion of 0.5 to 2% by weight of the composition; and then
   (f) subjecting the resulting composition to freezing conditions to produce the frozen soufflé.

2. The process of claim 1, wherein the flavouring base comprises a mixture of sweet buttermilk, cooked curd cheese and water, which is heated at 80° to 100° C., and crushed.

3. The process of claim 1, wherein the lactic protein of the protein base comprises:
   whey and/or skimmed milk proteins which have been subjected to ultrafiltration and have a protein concentration of at least 50% by weight.

4. The process of claim 1, wherein solid carbon dioxide is incorporated in the composition.

5. The process of claim 1, wherein after the composition is formed it is packed in individual packages and the filled packages are then frozen.

6. Frozen soufflés obtained by the process of claim 1.

* * * * *